(12) United States Patent
Benveniste et al.

(10) Patent No.: US 7,958,289 B2
(45) Date of Patent: Jun. 7, 2011

(54) METHOD AND SYSTEM FOR STORING MEMORY COMPRESSED DATA ONTO MEMORY COMPRESSED DISKS

(75) Inventors: Caroline Benveniste, New York, NY (US); Vittorio Castelli, Croton-on-Hudson, NY (US); Peter A. Franaszek, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 10/214,171

(22) Filed: Aug. 8, 2002

(65) Prior Publication Data
US 2004/0030813 A1 Feb. 12, 2004

(51) Int. Cl.
G06F 13/38 (2006.01)
G06F 13/00 (2006.01)
(52) U.S. Cl. ............... 710/68; 711/111; 711/168
(58) Field of Classification Search .......... 707/101, 707/821; 710/68, 22; 711/111–112, 118, 711/202
See application file for complete search history.

(56) References Cited

U.S. PATENT DOCUMENTS

| | | | | |
|---|---|---|---|---|
| 5,305,295 A * | 4/1994 | Chu | ............... | 711/202 |
| 5,481,701 A * | 1/1996 | Chambers, IV | ............... | 707/101 |
| 5,630,092 A * | 5/1997 | Carreiro et al. | ............... | 711/111 |
| 5,649,151 A * | 7/1997 | Chu et al. | ............... | 711/111 |
| 5,761,536 A | 6/1998 | Franaszek | | |
| 5,999,936 A * | 12/1999 | Pattison et al. | ............... | 707/101 |
| 6,292,840 B1 * | 9/2001 | Blomfield-Brown et al. | ............... | 709/247 |
| 6,439,375 B1 * | 8/2002 | Foster et al. | ............... | 198/775 |
| 2001/0054131 A1 * | 12/2001 | Alvarez et al. | ............... | 711/105 |

OTHER PUBLICATIONS

Microsoft Press Computer Dictionary 2$^{nd}$ Edntion, Definition for "DASD", 1994.*
Franaszek, et al., "Design and Analysis of Internal Organizations for Compressed Random Memories," IBM Research Report RC 21146, IBM Watson Research Center, Mar. 30, 1998 (revised Oct. 9, 1998).

* cited by examiner

Primary Examiner — Christopher B Shin
(74) Attorney, Agent, or Firm — McGinn Intellectual Property Law Group, PLLC

(57) ABSTRACT

A method (and system) of storing information, includes storing main memory compressed information onto a memory compressed disk, where pages are stored and retrieved individually, without decompressing the main memory compressed information.

14 Claims, 6 Drawing Sheets

METHOD AND SYSTEM FOR STORING MEMORY COMPRESSED DATA ONTO MEMORY COMPRESSED DISKS

BACKGROUND OF THE INVENTION

1. Field of the Invention

The present invention generally relates to compressed memory and compressed disk systems, and, more specifically, to a method for transferring memory compressed data to and from the disk adapter, and for storing memory compressed data on disk, thereby obviating the need to decompress and recompress data when transferring between memory and disk, and thus saving time and bandwidth in the system.

2. Description of the Related Art

Main Memory Compression

An emerging development in computer organization is the use of data compression in a computer system's main memory, where the data in the main memory is stored in a compressed format. For example, FIG. 1 shows the overall structure of an exemplary computer system 100 implementing a compressed main memory 110.

In FIG. 1, a central processing unit (CPU) 102 reads data to and writes data from a cache 104. Cache "misses" and "stores" result in reads and writes to a compressed main memory 110 by a compression controller 106.

That is, typically the CPU will obtain the data from the cache 104 (e.g., assuming a cache "hit"), whereas on a cache "miss" the CPU will obtain the data from the main memory 110 through the compression controller 106. Such data would be retrieved to the CPU and then the data would be stored to the cache 104 (e.g., typically a so-called "store-through" cache, which is one of the most common caching techniques).

The compressed main memory 110 is typically divided into a number of logically fixed-size segments (e.g., segments spanning a range of contiguous memory addresses). These logical segments are the units of compression and are referred to as "memory lines". Memory lines are physically stored in a compressed format, and therefore occupy a variable number of physical memory locations. There are several proposed computer system designs where the contents of main memory is compressed, including U.S. Pat. No. 5,761,536, entitled "System and Method for Reducing Memory Fragmentation by Assigning Remainders to Share Memory Blocks on a Best Fit Basis" and Franaszek et al., "Design and Analysis of Internal Organizations for Compressed Random Access Memories", IBM Research Report RC 21146, IBM Watson Research Center, Mar. 30, 1998 (revised Oct. 9, 1998).

In a paged memory system, the unit of memory management is a "page", usually consisting of 4096 bytes having consecutive real addresses, aligned on a 4096 byte boundary. The unit of compression can be any size and in some systems the unit of compression is a page.

To simplify management of the compressed memory system, it is better to select the size of the unit of compression (called a "line") so that the uncompressed size of a page is a multiple of the uncompressed size of a line. A page is then divided into a fixed number of lines, and the bytes of a line are compressed and decompressed together. Hereinbelow, it will be assumed that an uncompressed line is 1024 bytes long.

Compressing a line produces a variable-size compressed line (e.g., different lines will compress to different numbers of bytes). The compressed size of a line is an important parameter, which is needed for physical memory management. If a line that does not compress to less than its original size is left uncompressed, one needs (1+log(n)) bits to describe the size of the compressed line, where n is the original size in number of bytes, and the logarithm is base 2.

To simplify management, the size of a compressed line can be constrained to be a multiple of a fixed number of bytes, for instance by "padding" the compressed line with zeros. The term "granule" is used to denote the atomic size of compressed data. The granule size should be a divider of the line size.

FIG. 2 shows, in more detail, an architecture 200 of a compressed main memory system 210. The architecture 200 includes a cache 240, containing cache lines 241 and a cache directory 242, the compression controller 260, containing a compressor 261 and a decompressor 262, and compressed main memory 210. The compressed main memory 210 includes a directory 220 and a number of fixed sized blocks 230, also called "memory sectors". The above exemplary format and organization is what is referred to as "main memory compressed data."

As shown in FIG. 2, for a read from the compressed memory to the cache, the decompressor 262 is employed, whereas on a write from the cache to the compressed main memory, the line must be compressed via the compressor 261. As known, lines in the cache are similarly held in the main memory. Along these lines, if a line must be evicted from the cache (e.g., the cache capacity is exhausted), then the cache line being evicted is written back to the compressed main memory 210 via the compressor 261 if modified.

If a cache line associated with address A is not found in the cache 240, then this address A 270 is used to index into the directory D 220. This is different from a conventional computer system where the address is used to directly reference a location in the memory M 210.

Each directory entry contains information which allows the associated cache line to be retrieved. The units of compressed data referred to by directory entries in D 220 may correspond to cache lines 241, or the unit of compression may be larger than a cache line in which case multiple cache lines would be compressed together into one unit of compression.

The directory entry 221 for line 1 associated with address A1 271 is for a line which has been compressed to a degree in which the compressed line can be stored entirely within the directory entry. Lines A2 272, A3 273, and A4 274 in FIG. 2 do not compress sufficiently to be stored in a directory entry, and therefore they are stored in an integer number of memory sectors.

The directory entry 222 for line 2 associated with address A2 272 is for a line which is stored in compressed format using a first full memory sector 231 and second partially filled memory sector 232.

Finally, the directory entries 223 and 224 for line 3 and line 4 associated with addresses A3 273 and A4 274 are for lines stored in compressed formats using a number of full memory sectors (2 sectors 233 and 234 for line 3, and no sector for line 4) and in which the remainders of the two compressed lines have been combined in block 235. Memory-sector sharing by different lines within a page (or across pages) is done to reduce fragmentation, and in this situation, lines sharing a memory sector are called roommates.

FIG. 3 shows some examples of directory (220) entry formats, which can be used in the directory 220 of the main memory system 210 of FIG. 2. For this example, it is assumed that the memory sectors 230 of FIG. 2 are of size 256 bytes, and that the cache lines 241 of FIG. 2 are of size 1024 bytes. Hence, lines can be stored in an uncompressed format using four memory sectors.

For this example, directory entries of size 16 bytes are used, in which the first byte includes a number of flags. The contents of the first byte 301 determines the format of the remainder of the directory entry.

A flag bit 302 specifies whether the line is stored in compressed or uncompressed format. If stored in uncompressed format, then the remainder of the directory entry is interpreted as for line 1 306, in which four 30-bit addresses give the addresses in memory of the four memory sectors containing the line.

If stored in a compressed format, then a flag bit 303 indicates whether the compressed line is stored entirely within the directory entry. If so, then the format of the directory entry is as for line 3 308, in which up to 120 bits of compressed data are stored. Otherwise, for compressed lines longer than 120 bits, the formats shown for line 1 306 or line 2 307 may be used.

In the case of the line 1 306 format, additional flag bits 304 specify the number of blocks used to store the compressed line, from one to four 30-bit addresses specify the locations of the sectors, and finally the size of the remainder, or fragment, of the compressed line stored in the last memory sector (in units of 32 bytes), together with a bit indicating whether the fragment is stored at the beginning or at the end of the memory sector, is given by four fragment information bits 305.

Directory entry format 307 illustrates an alternative format in which part of the compressed line is stored in the directory entry (to reduce decompression latency). In this case, addresses to only the first and last sectors used to store the remaining part of the compressed line are stored in the directory entry, with intervening sectors (if any) found using a linked list technique. That is, each sector used to store the compressed line has, if required, a pointer field containing the address of the next memory sector used to store the given compressed line.

Thus, many different formats may be used in the directory 220 for the compressed main memory according to the decompression/compression of the data.

Disk Compression

Another problem arises in disk systems in going from the disk to the main memory and trying to individually access compressed pages on the disk as opposed to accessing compressed data in the main memory. Indeed, typically the disk and main memory employ two different compression systems having different formats. As a result, compressed data from the main memory must be decompressed and then sent to the disk system where it is recompressed again, and vice versa. Thus, there has been no facility to take compressed data from the disk and place it directly onto the main memory, where the compressed data can then be referenced as described above as compressed main memory data.

In some disk systems, such as the IBM AS/400 DASD® adapter, pages are stored in compressed form to improve the price/capacity ratio. Typically, individual pages (or groups of pages) are compressed into a variable number of fixed-length blocks, called "disk sectors".

FIG. 4 shows the structure of the I/O processor (IOP) 400 and how it is attached to the rest of the system, and more specifically is a high-level representation of an Input/output adaptor (IOA) 405 and the input/output processor 400.

Generally, it is shown that one side is connected back to the system and the other side will be connected to the disk system, and the IOP 400 generally has its own compressor/decompressor 403. That is, data that is being stored on the disks will be compressed in the IOP since the information from the main memory does not come already compressed from the main memory. The operation of the IOP 400 is controlled by the IOP processor complex 402, which communicates with the main system over a system bus 406 through a system bus to IOA bus adapter 401. The IOP 400 has a local memory 404. If the IOP supports compression in hardware, it contains a compressor/decompressor subsystem 403. The IOP controls one or more IOA adapters 405, which provides an interface with the direct access storage disk (DASD) over a DASD bus 407.

In a compressed disk, the unit of compression is typically a page (e.g. 4096 bytes), which is also the atomic unit of I/O. Physical space on disks is managed in atomic units called sectors. A disk sector typically contains 512 bytes of data and can contain additional information such as cyclic redundancy code (CRC) bytes and system headers.

When a page is written to a compressed disk, it is first compressed, and the resulting compressed page is stored in an integer number of disk sectors. Several approaches to managing and organizing compressed disks are possible, which rely on different directory data structures.

From the description of the conventional techniques, it is clear that the organization of a compressed disk and of a compressed memory are usually very different. This is the case, for instance, when the disk subsystem is separate from the computing units (as in Enterprise Storage servers such as SHARK® or EMC® disk servers), or when the two technologies are developed separately (as would be the case for AS/400® machines supporting memory compression and using the current disk adapter.)

Since the structures that have been created to support memory compression and disk compression are quite different, some inefficiencies arise when a system supporting memory compression operates with a compressed disk.

For example, when data is transferred from memory to disk and from disk to memory, the data must first be decompressed, then transferred, and then recompressed, as mentioned above.

In principle, data could be transmitted in compressed form to and from the disk. This would not only obviate the need to perform additional compressions and decompressions, but it would also effectively increase the bandwidth of the links.

Additionally, if the data is transmitted from memory to disk adapter in compressed format, then the disk adapter would know in advance the size of the data, and would be able to make better storage management decisions. In contrast, in current compressed disk systems, the disk adapter allocates storage based on how it expects the data to compress.

However, transmitting such compressed data directly to disk without additional and costly steps of decompression and recompression requires changes to the I/O operations and the system structure. These changes are the subject of the present invention.

SUMMARY OF THE INVENTION

In view of the foregoing and other problems, drawbacks, and disadvantages of the conventional methods and structures, an object of the present invention is to provide a method and structure in which reduced latency in I/O operations is achieved.

Another object is to provide a method and system in which data can be transferred to and from disk without having to be buffered while waiting for compression/decompression.

Another object is to provide a method and system in which increased bandwidth is provided between main memory and disk, by a factor equal to the compression ratio in main memory.

Yet another object is to provide a method and system in which a compressed disk can be used as a paging system for a compressed memory system.

Yet another object is to provide a method and system which do not rely on specific features of the compressed disk organization, and can be used with any existing compressed disk scheme.

In a first aspect of the present invention, a method (and system) of storing information, includes storing main memory compressed information onto a memory compressed disk, where pages are stored and retrieved individually, without decompressing the main memory compressed information.

In a second aspect of the present invention, a method (and system) for use in a computer system supporting main memory compression, connected to a storage system supporting compression, includes storing memory compressed data to compressed disk, and retrieving memory compressed data from disk. It is noted that "data" refers to the generic content of memory, and includes program code.

With the unique and unobvious aspects of the present invention, a method (and system) are provided for storing memory-compressed data directly to disk.

Further, the invention results in reduced latency in I/O operations. Indeed, the data can be transferred to and from disk without having to be buffered while waiting for compression/decompression.

Further, reduced resource consumption occurs at the disk adapter. That is, the data does not need to be buffered while waiting for compression/decompression, and there is no need to manage the queue of pages waiting to be compressed/decompressed, etc.

Additionally, increased bandwidth is possible between main memory and disk, by a factor equal to the compression ratio in main memory.

Furthermore, better algorithms are provided for data placement on disk. That is, since the size of the compressed data is known, better storage decisions can be made about how to place the compressed data on disk Additionally, with the invention, a compressed disk can be used as a paging system for a compressed memory system. That is, in a compressed memory system without compressed secondary store, pages swapped to disk by the operating system are decompressed while the I/O operation is executed.

Further, the present invention does not rely on specific features of the compressed disk organization, and can be used with any existing compressed disk scheme. Indeed, the invention can be used by existing hardware systems (e.g., the exemplary hardware systems of FIGS. 1 and 4) and does not require any substantial modification to the existing hardware.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
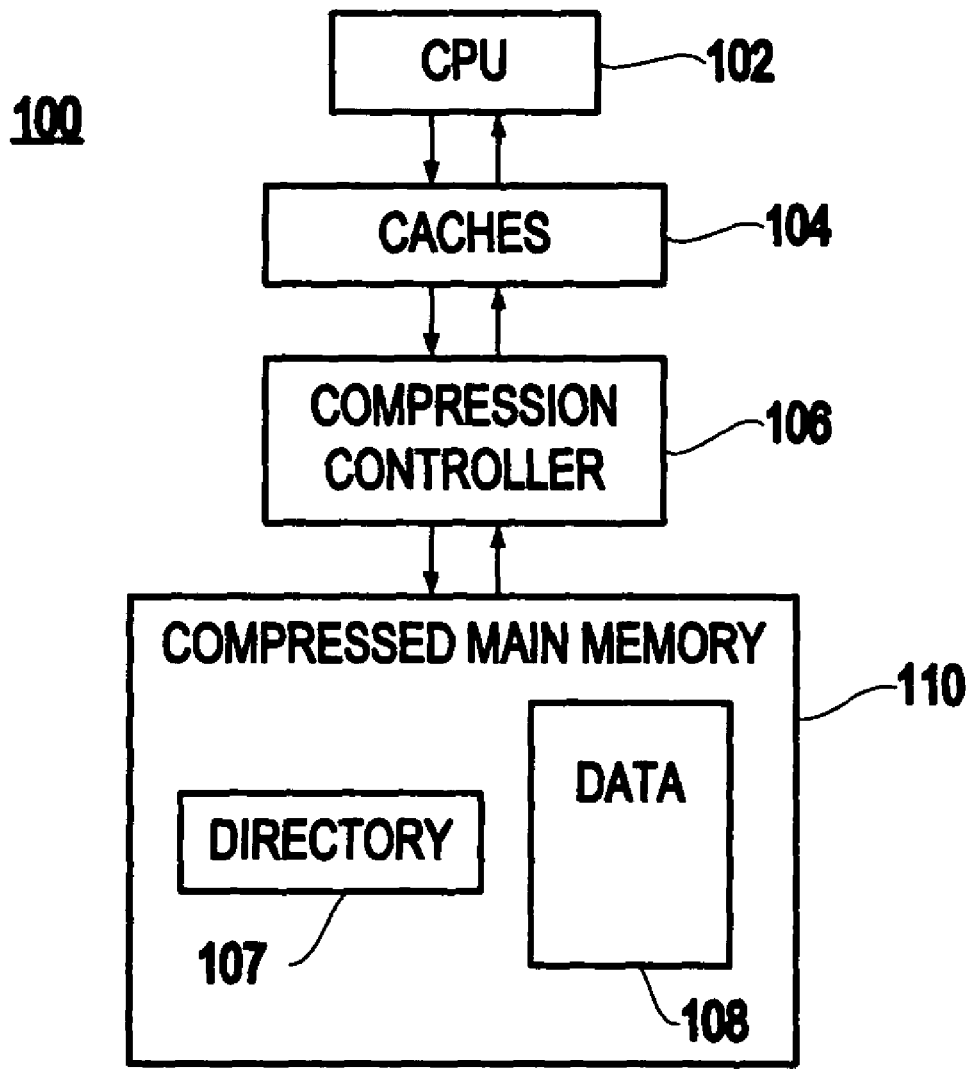
FIG. 1 illustrates a structure of a computer system 100 using a compressed main memory 110.
Figure 2:
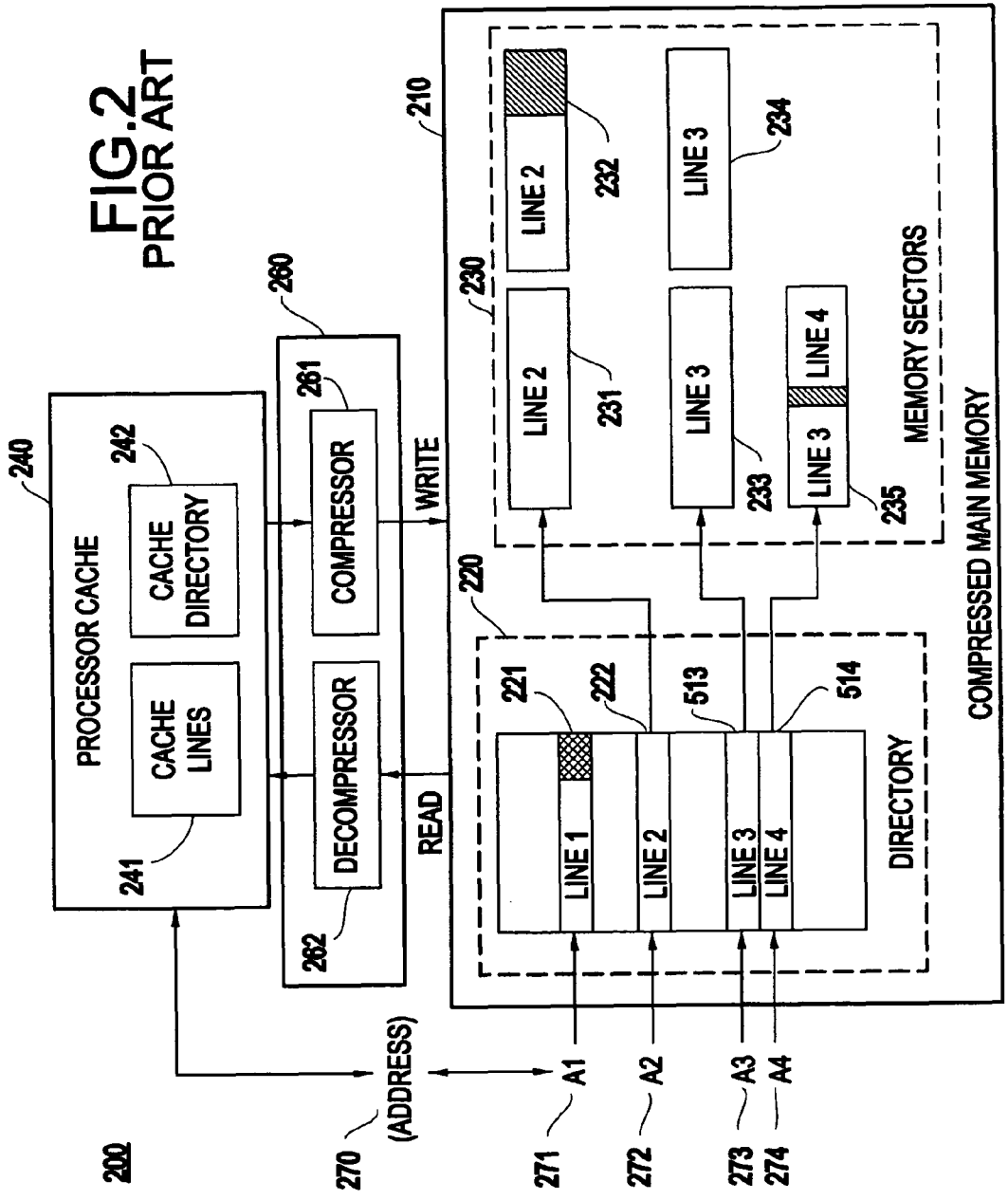
FIG. 2 illustrates a compressed main memory system organization 200.

Referring now to the drawings, and more particularly to FIGS. 1-7, there are shown preferred embodiments of the method and structures according to the present invention.

PREFERRED EMBODIMENT

In a preferred embodiment, it is assumed that cache lines and memory lines have the same size (e.g., 1024 bytes), that memory granules are 64 bytes long, and that memory sectors are 256 bytes long and are aligned on 256-byte boundaries.

Obviously, as would be evident to one of ordinary skill in the art taking the present application as a whole, the invention is not limited to this particular choice of methods.

The invention has several main components, including how to transmit memory-compressed data from the processor to the IOP, and between the IOP and the disk, and how to store memory-compressed data on disk. These components will be discussed in turn below.

Transmitting Memory-Compressed Data to and from the I/O Processor/ I/O Adapter (IOP/IOA)

The transfer of data between the processor and the IOA/IOP and between the IOA/IOP and the disk depends on the architecture of the computing system.

In a preferred embodiment, the architecture of the computer supports an interprocessor communication protocol that allows data to be transferred between different nodes in compressed format.

In one embodiment, the memory controller provides support for NUMA (non uniform memory access).

In another embodiment, the memory controller supports message passing between processors or processor clusters. In both embodiments, data is transferred in a compressed format. The atomic unit of transfer is the atomic unit of compression or a multiple thereof, and the information required to decompress the data is transmitted before the compressed data. This information, for example, includes the Flags 301 of FIG. 3.

In these preferred embodiments, the operating system driver in the computer and the code in the I/O Processor, or IOP, would communicate the same information (e.g., directory information and compressed memory sectors) that is transmitted when processors transfer data between themselves, as described above.

In another preferred embodiment, the architecture allows direct memory access (DMA) to compressed memory.

Figure 5:
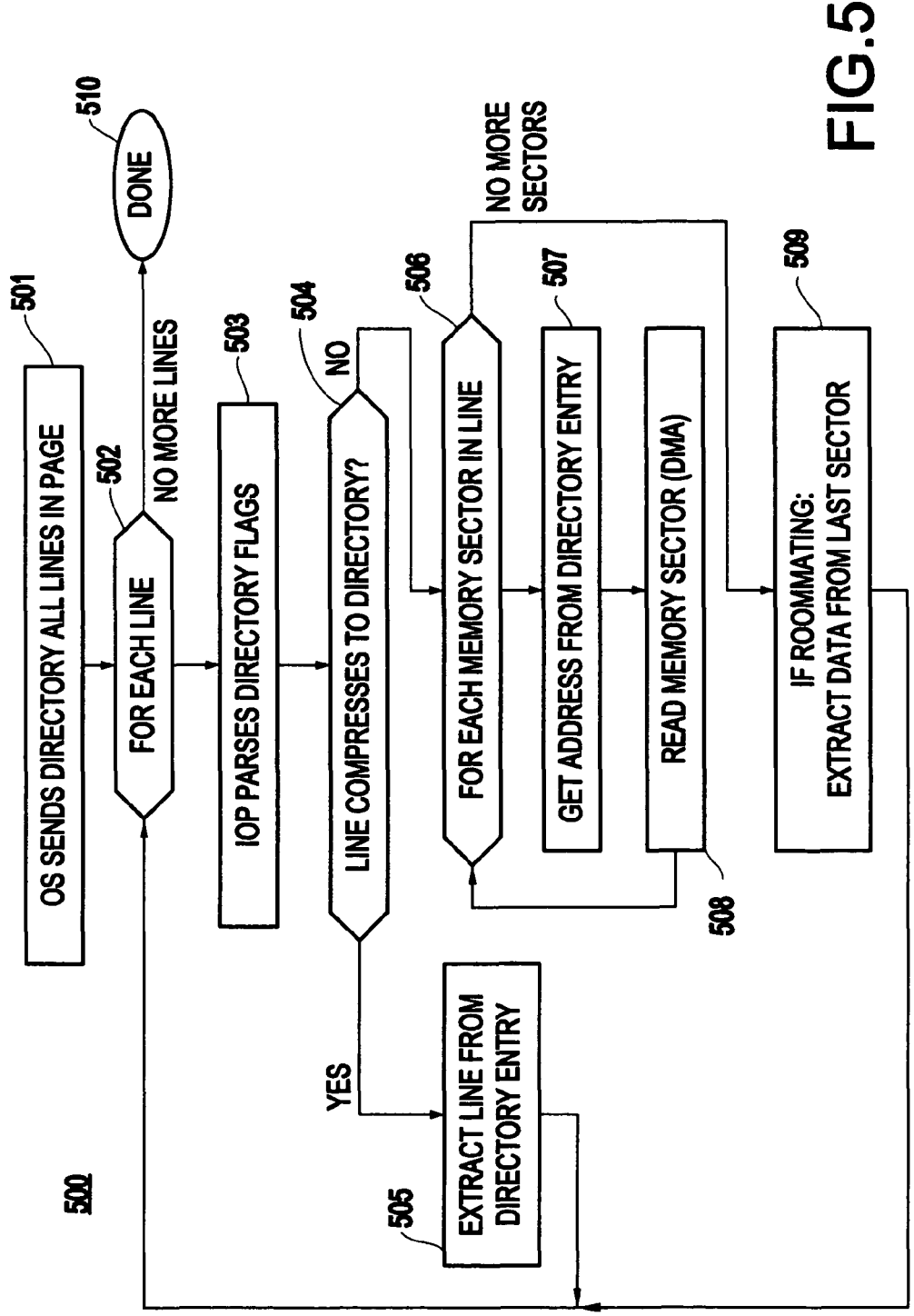
FIG. 5 illustrates a flowchart of a method 500 for a communication protocol between an IOP (e.g., 400) and an operating system (OS) during a disk write, for a system supporting direct memory access (DMA) transfers from and to compressed memory, according to the present invention.

FIG. 5 depicts a flowchart of a method 500 illustrating a disk write operation (e.g., storage operation ) utilizing the present invention. Again, it is noted that the invention can be applied to the existing hardware, to make the hardware more efficient.

In step 501, the operating system sends to the I/O Processor the entire directory contents (all lines) associated with the page to be written. The IOP iterates over each line contained in the page (step 502), until there are no more lines (step 510)

at which time the process ends. It is noted again that "line" refers to however the line is compressed (e.g., whatever unit is employed for compression).

For each line, the IOP parses the directory flags (e.g., flags 301 shown in FIG. 3 including "compressed/uncompressed", "stored in directory", etc.) in step 503 and tries to understand (determine) how the data has been stored (e.g., what the format is), and checks whether the compressed line is contained in the directory in step 504.

In the inventive method, it is generally assumed that the line size is larger than the unit of compression, and the disk is looking on a page basis. Thus, it will be determined which lines are in the page and then obtain those directories. Then, the system must determine if the line is stored in the directory, and then either the system will find the data in the directory or retrieve the data out of the memory sectors. In any event, upon completion, the system will have the data for each line.

Thus, returning to the flowchart of FIG. 5, if the compressed line is stored entirely in (compresses to) the directory, in step 505 the IOP extracts it from the directory entry, and the next line is accessed in step 502.

Otherwise (e.g., if the line does not compress to the directory in step 504; a "NO" in step 504), in step 506 the IOP iterates over the memory sectors containing the compressed line. The IOP extracts from the directory entry the address of each sector in step 507, and reads the sector from memory through a DMA operation in step 508.

Then, the process loops back to step 506 if there are more memory sector(s). Such a process iterates until all of the data has been retrieved for a particular line, from the memory sector(s).

If the last sector is shared between different memory lines (e.g., the case of "roommating" in which a last portion of information is in a last sector being shared), then in step 509 the IOP extracts data from the last sector.

Figure 3:
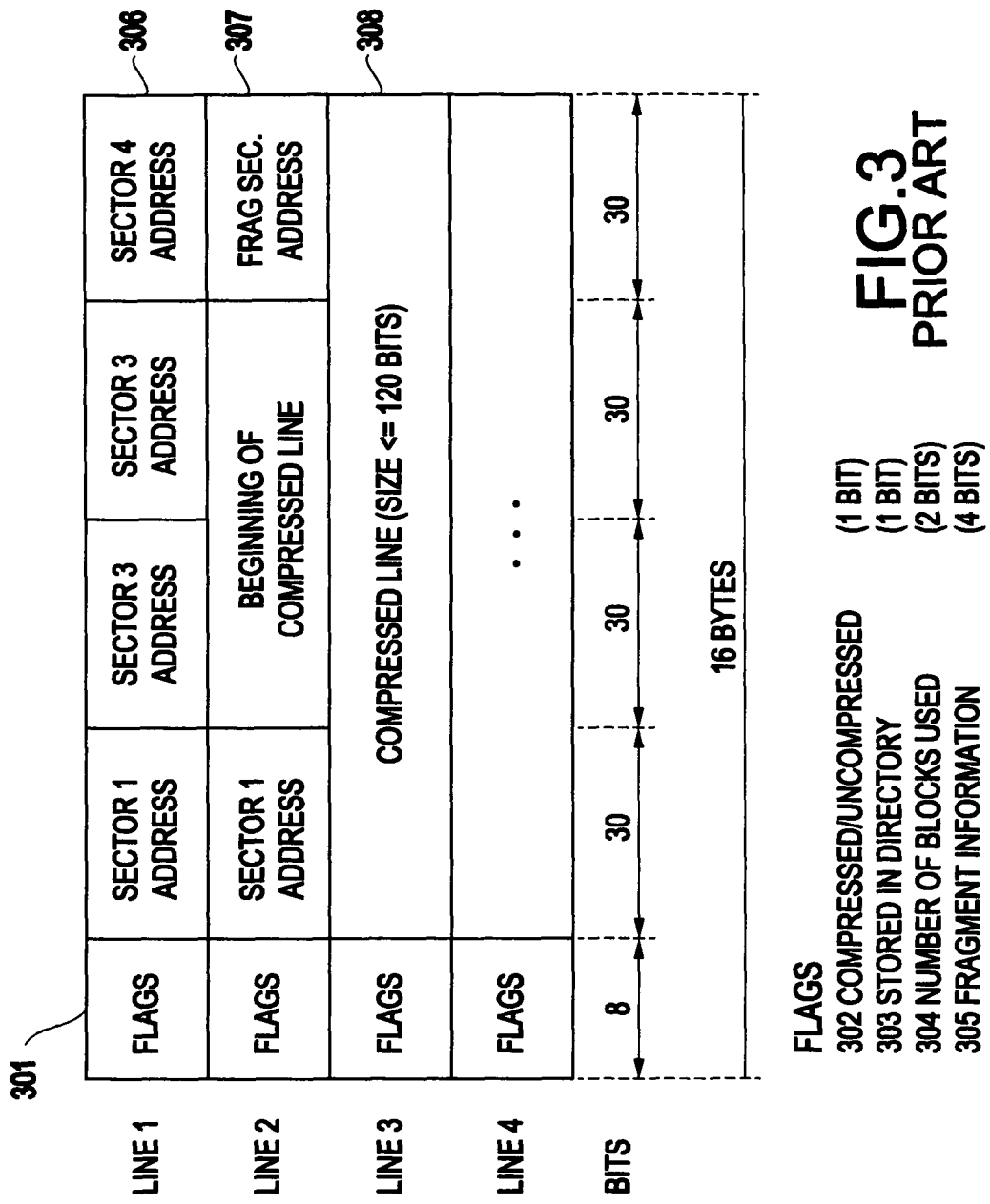
FIG. 3 illustrates a directory entry format of the compressed main memory 220.
Figure 4:
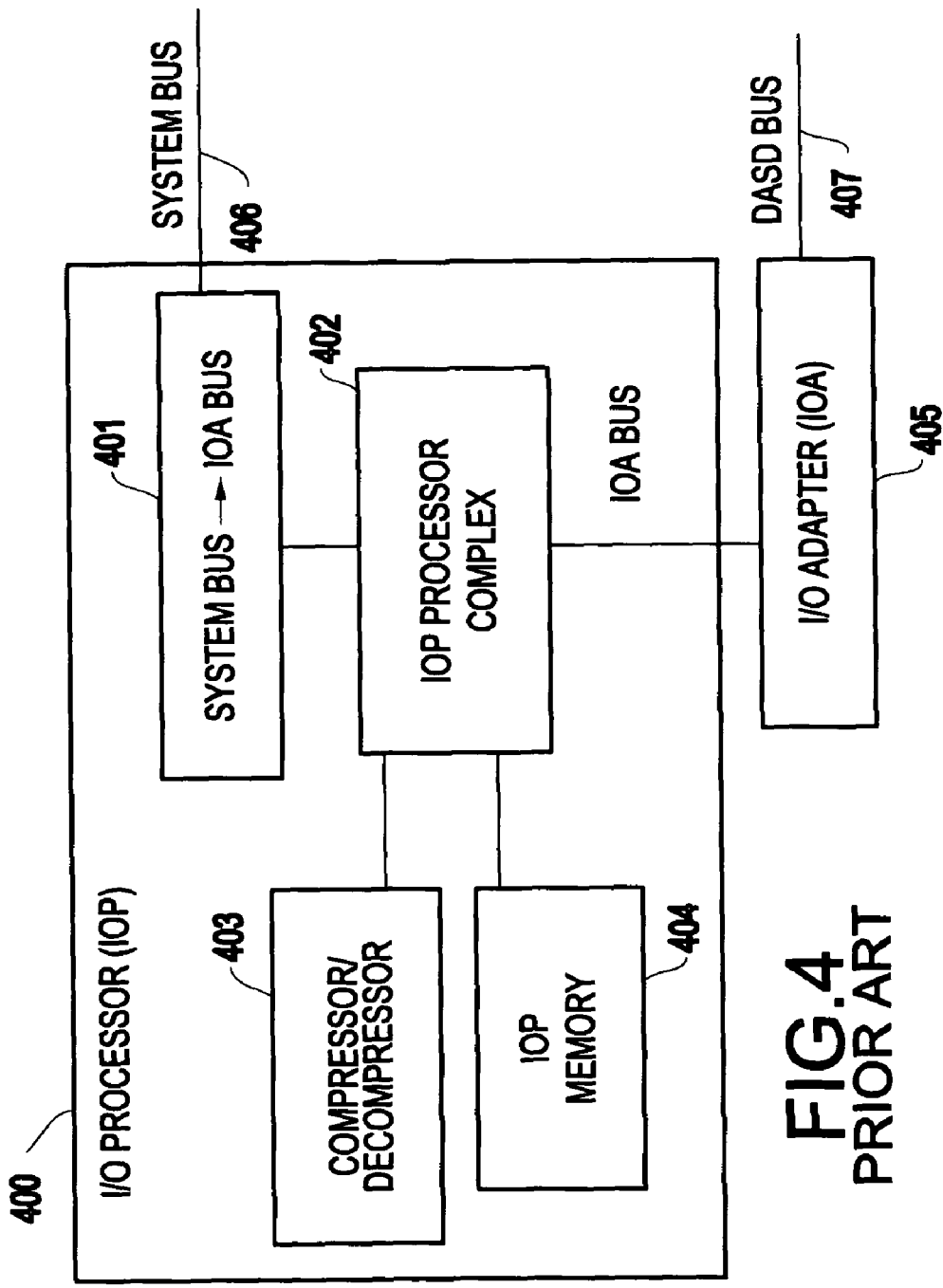
FIG. 4 illustrates an I/O Processor (IOP) 400 and I/O Adapter (IOA) 405.

It is noted that, in such a case, it would be advantageous to determine where the data is located in the last sector (e.g., the beginning of the sector or the end of the sector). Such a location would be indicated preferably by a directory flag 305 as shown in FIG. 3.

In a different embodiment, step 509 is not performed, and the shared sector is not disassembled. In both embodiments, a shared sector is read only once from memory. When the last line has been read from memory, the transfer protocol terminates in step 510.

Thus, the invention provides an efficient way of storing data that has already been compressed in the memory, onto the disk.

Regarding a read operation from disk, the above operation may be similar if the data compression/storage format used was the same as in the memory (e.g., the format of FIG. 6 described below). By the same token, if the data was compressed differently, then the above operation would be somewhat different since the data would be compressed differently.

That is, during a read, the operating system driver communicates to the IOP n addresses of unused segments, where n is the maximum number of segments required to store the data (e.g., in this example, 16 per page). These segments are also removed from the list of free segments.

The IOA reads the data from the disk and writes the segments in the indicated locations, and at the same time re-assembles the directory information from the contents of the disk and the physical addresses of the segments.

When the transfer is completed, the directory information is communicated to the operating system driver, which updates the compressed memory directory. Since the number of segments needed to store the segments may be smaller than n, any unused segments are returned to the free list.

Storing Memory-Compressed data Onto a Compressed Disk

Figures 6, 7:
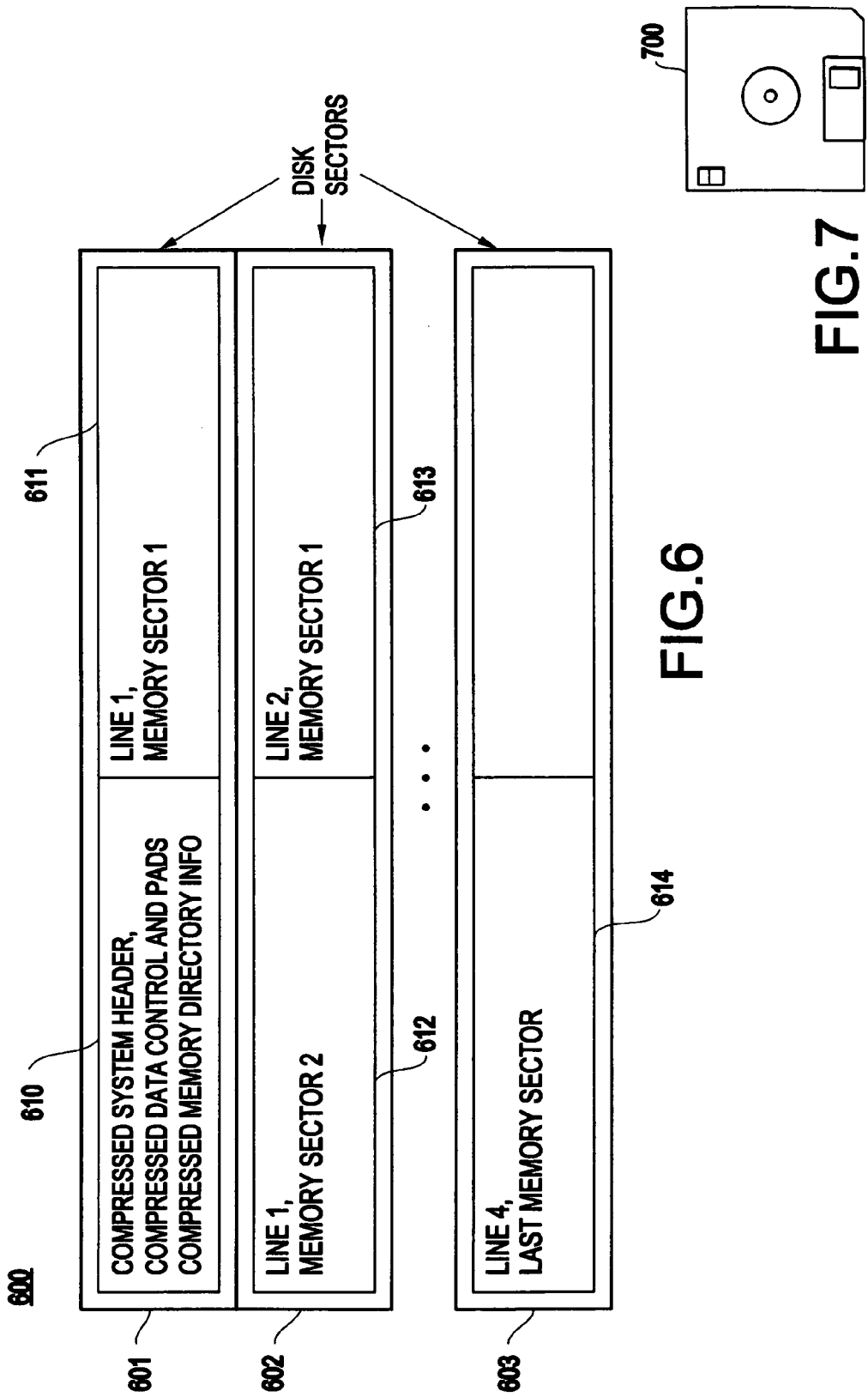
FIG. 6 illustrates an exemplary storage format 600 to store data from an integer number of memory sectors onto a disk into each disk sector, according to the present invention.
FIG. 7 illustrates a signal bearing medium 700 (e.g., storage medium) for storing steps of a program of a method according to the present invention.

FIG. 6 illustrates a method of storing the data onto a disk in the disk sectors 601, 602, 603.

The unit of I/O in typical computer systems is either a disk sector or a page. In the AS/400® compressed DASD, the unit of I/O is a page. Windows NT® and Windows 2000® also read and write data in pages.

The IOP of a compressed DASD compresses 4K of data into a variable number of bytes, and stores them into a certain number of sectors. In the preferred embodiment, which for example uses the AS/400® compressed DASD, a page is stored in a variable number of disk sectors, and two different pages cannot share a disk sector. Compressed pages are also stored in contiguous disk sectors. Pages that do not compress to a predetermined amount (e.g., ⅞ or less) of their original size, including some header information which is stored with the data, are stored uncompressed in 9 disk sectors: 8 for the data and 1 for the system header.

Generally, the units of compression may not be the same on the disk and on the memory. Hence, the exemplary scheme of FIG. 6 may be used. In the exemplary scheme, each disk sector can hold 512 bytes, and thus can store two memory sectors having 256 bytes.

In this invention, two methods are proposed for storing memory-compressed data in a variable number of disk sectors.

First Method

The first method includes storing the Compressed System Header, Compressed Data Control and Pads (if needed, as it is the case in the AS/400® DASD) together with the directory information in a 256B memory sector, and storing this memory sector together with the memory sectors of the compressed lines into the data portion of disk sectors.

Since, in the preferred embodiment, a disk sector contains 512 bytes, two (2) memory sectors can be stored in each disk sector. A convention is followed for the order in which memory segments are stored in disk segments, so that the IOA knows where shared memory sectors are stored on disk.

In the example illustrated in FIG. 6, disk sectors are depicted as thick-lined rectangles, and memory sectors are depicted as thin-lined rectangles.

Disk sector 601 stores a memory sector 610 containing a compressed system header, compressed data control and pads, and directory information for the lines in the page, and the first memory sector 611 containing compressed data belonging to line 1 of the stored page. In this example, memory line 1 compresses to two memory sectors, the second of which (612) is stored at the beginning of disk sector 602. The second part of disk sector 602 contains the first memory sector used by line 2 (613). The last disk sector 603 used to store the compressed page contains the last memory sector (614 in FIG. 6).

The advantage of the above-described solution is its simplicity. That is, memory segments are left unmodified, and are read and written in exactly the same format as used in main memory.

The disadvantage is increased fragmentation due to three factors. For example, if lines are not roommates, their last memory segment is partially filled. Additionally, the additional memory segment containing the directory information and the system header is mostly empty.

Finally, if the number of memory sectors used by a page and the header, control, and directory information is odd, one of the disk sectors is only half utilized, as depicted in FIG. 6 (sector 603).

Second Method

The second method includes organizing the data as follows:

Compressed System Header, Compressed Data Control, Pad, (page_size/line_size)*log2(line_size/granule_size) bits to describe the number of granules used by all the compressed lines, and a counter are stored together in a variable number of granules. These granules are termed "header granules". The counter contains the number of header granules. The format is such that the IOA can easily recover the data. The granules that make up each compressed line are extracted from the memory segments by the IOA, sequentially concatenated to the header granules, and stored in an integer number of disk sectors.

Upon reading from disk, the IOA reassembles granules into memory segments according to the memory compression format.

The advantage of this solution is improved fragmentation, which is now on average equal to 2.5 times the size of a granule (before organizing the data into a fixed number of segments). A second potential advantage results from the possibility of better reorganizing the roommates when the data is read from disk.

The disadvantage is a slightly increased complexity of the code at the IOA.

In addition to the environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating a CPU and hardware above, to perform the method of the invention.

This signal-bearing media may include, for example, a RAM contained within the CPU, as represented by the fast-access storage for example. Alternatively, the instructions may be contained in another signal-bearing media, such as a magnetic data storage diskette 700 (FIG. 7), directly or indirectly accessible by the CPU.

Whether contained in the diskette 700, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the invention, numerous advantages are provided including lower required bandwidth, less disk space, less space required in the disk cache, and better utilization of the memory compressor/decompressor (not required to store/retrieve pages from disk).

While the invention has been described in terms of several preferred embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method of storing information, comprising:
providing a host system having a main memory, and a compressed disk; and
storing main memory compressed information onto the compressed disk from the main memory and retrieving main memory compressed information from the compressed disk, where pages are stored and retrieved individually, without decompressing said main memory compressed information,
wherein the host system and the compressed disk employ different compression systems having different formats.

2. The method of claim 1, further comprising:
sending compressed memory directory information to said disk.

3. The method of claim 2, further comprising:
interpreting said compressed memory directory information to obtain a physical memory location of memory sectors used by the data.

4. The method of claim 3, further comprising:
copying a content of said memory sectors, to said disk.

5. A tangible computer-readable storage device embodying a program of machine-readable instructions executable by a digital processing apparatus to perform a method of storing main memory compressed information, said method comprising:
storing said main memory compressed information onto a memory compressed disk, without decompressing said main memory compressed information,
wherein the main memory and the compressed disk employ different compression systems having different formats.

6. The tangible computer-readable storage device of claim 5, the method further comprising:
sending compressed memory directory information to said memory compressed disk.

7. The tangible computer-readable storage device of claim 6, the method further comprising:
interpreting said compressed memory directory information to obtain a physical memory location of memory sectors occupied by the data.

8. The tangible computer-readable storage device of claim 7, the method further comprising:
copying a content of said memory sectors, to said memory compressed disk.

9. The tangible computer-readable storage device of claim 5, wherein the method further comprises:
providing a compression controller between a processor and a compressed main memory, which stores said main memory compressed information, of a host computer.

10. The tangible computer-readable storage device of claim 5, wherein the method further comprises:
providing a compressor/decompressor for an input/output processor (TOP) coupled between said main memory and said memory compressed disk.

11. The tangible computer-readable storage device of claim 5, wherein the method further comprises:
providing a storage with a compressor/decompressor.

12. The tangible computer-readable storage device of claim 5, wherein the method further comprises:
providing a host processor with a compressor/decompressor between a central processing unit cache and a memory of the host processor.

13. The tangible computer-readable storage device of claim 5, wherein a content of said main memory compressed information is maintained in compressed form by a compressor/decompressor located between a central processing unit and said main memory.

14. The method of claim 1, wherein said storing main memory compressed information onto the compressed disk comprises:

storing a compressed system header, compressed data control and pads, and directory information in a first disk sector of the compressed disk; and storing compressed data in a second disk sector of the compressed disk.

\* \* \* \* \*